United States Patent
Qi et al.

(10) Patent No.: US 7,081,234 B1
(45) Date of Patent: Jul. 25, 2006

(54) PROCESS OF MAKING HYDROPHOBIC METAL OXIDE NANOPARTICLES

(75) Inventors: Yu Qi, Oakville (CA); Nan-Xing Hu, Oakville (CA); Ah-Mee Hor, Mississauga (CA); Cheng-Kuo Hsiao, Mississauga (CA); Yvan Gagnon, Mississauga (CA); John F. Graham, Oakville (CA)

(73) Assignee: Xerox Corporation, Stamford, CT (US)

( * ) Notice: Subject to any disclaimer, the term of this patent is extended or adjusted under 35 U.S.C. 154(b) by 274 days.

(21) Appl. No.: 10/816,829

(22) Filed: Apr. 5, 2004

(51) Int. Cl.
*C01F 7/02* (2006.01)
*G03G 15/00* (2006.01)
*G03G 15/02* (2006.01)

(52) U.S. Cl. .............. 423/592.1; 423/325; 423/625; 423/609; 423/610; 423/263; 423/607; 423/608; 423/622; 423/618; 423/632; 423/635; 423/605; 423/594.19; 423/604; 423/594.9; 430/58.05; 430/58.1; 430/58.2; 428/357; 428/402; 428/405; 977/773; 977/811; 399/159

(58) Field of Classification Search .............. 423/325, 423/625, 609, 610, 263, 607, 608, 622, 618, 423/632, 635, 605, 594.19, 604, 594.9, 592.1; 430/58.05, 58.1, 58.2; 428/357, 402, 405; 977/773, 811; 399/159

See application file for complete search history.

(56) References Cited

U.S. PATENT DOCUMENTS

| 5,096,795 | A | 3/1992 | Yu |
| 5,695,900 | A | 12/1997 | Selim |
| 5,695,901 | A | 12/1997 | Selim |
| 5,725,983 | A | 3/1998 | Yu |
| 5,993,967 | A | 11/1999 | Broteman, Jr. et al. |
| 6,033,781 | A | 3/2000 | Broteman, Jr. et al. |
| 6,326,111 | B1 | 12/2001 | Chambers et al. |
| 6,337,166 | B1 | 1/2002 | Chambers et al. |
| 6,416,818 | B1 | 7/2002 | Aikens et al. |
| 2003/0034486 | A1* | 2/2003 | Korgel ............ 257/13 |
| 2005/0233235 | A1* | 10/2005 | Qi et al. ............ 430/66 |

* cited by examiner

*Primary Examiner*—Stanley S. Silverman
*Assistant Examiner*—Timothy C. Vanoy
(74) *Attorney, Agent, or Firm*—Oliff & Berridge, PLC

(57) ABSTRACT

A process of treating metal oxide nanoparticles that includes mixing metal oxide nanoparticles, a solvent, and a surface treatment agent that is preferably a silane or siloxane is described. The treated metal oxide nanoparticles are rendered hydrophobic by the surface treatment agent being surface attached thereto, and are preferably dispersed in a hydrophobic aromatic polymer binder of a charge transport layer of a photoreceptor, whereby π—π interactions can be formed between the organic moieties on the surface of the nanoparticles and the aromatic components of the binder polymer to achieve a stable dispersion of the nanoparticles in the polymer that is substantially free of large sized agglomerations.

19 Claims, No Drawings

PROCESS OF MAKING HYDROPHOBIC METAL OXIDE NANOPARTICLES

BACKGROUND OF THE INVENTION

1. Field of Invention

This invention relates to a process of making metal oxide nanoparticles capable of forming a stable dispersion in a hydrophobic polymer matrix, as well as to such a hydrophobic polymer matrix. The hydrophobic polymer matrix having metal oxide nanoparticles therein can find utility in a broad range of applications, including as a charge transport layer composition of a photoreceptor used in electrophotography.

2. Description of Related Art

In electrophotography or xerography, an electrophotographic plate, or photoreceptor, comprising a photoconductive insulating layer on a conductive layer is imaged by first uniformly electrostatically charging the surface of the photoconductive insulating layer. The plate is then exposed to a pattern of activating electromagnetic radiation such as light, which selectively dissipates the charge in the illuminated areas of the photoconductive insulating layer while leaving behind an electrostatic latent image in the non-illuminated areas. This electrostatic latent image may then be developed to form a visible image by depositing finely divided electroscopic toner particles, for example from a developer composition, on the surface of the electrophotographic plate. The resulting visible toner image can be transferred to a suitable receiving member such as paper.

Electrophotographic imaging members are usually multilayered photoreceptors that comprise at least a substrate support, an electrically conductive layer, an optional hole blocking layer, an optional adhesive layer, a charge generating layer, and a charge transport layer. The imaging members can take several forms, including flexible belts, rigid drums, etc. For most multilayered flexible photoreceptor belts, an anti-curl layer is usually employed on the back side of the substrate support, opposite to the side carrying the electrically active layers, to achieve the desired photoreceptor flatness. One type of multilayered photoreceptor comprises a layer of finely divided particles of a photoconductive inorganic compound dispersed in an electrically insulating organic resin binder.

Examples of photosensitive members having at least two electrically operative layers including a charge generating layer and a diamine containing transport layer are disclosed in U.S. Pat. Nos. 4,265,990, 4,233,384, 4,306,008, 4,299,897 and 4,439,507. The disclosures of these patents are incorporated herein by reference in their entireties.

Photoreceptor wear is an area of concern as wear has a major impact on total cost of the device and a negative impact upon print quality, particularly in color xerographic devices. To combat photoreceptor wear, two main approaches have been taken: the use of reinforced charge transport layers or the use of overcoats.

Charge transport layers are known to be comprised of any of several different types of polymer binders that have a charge transport molecule dispersed therein. However, these conventional charge transport layers suffer from a fast, nearly catastrophic wear rate. Previously, Xerox has invented a reinforced charge transport layer containing polytetrafluoroethylene (PTFE) alone (see, for example, U.S. Pat. No. 6,337,166), silica filler alone (see, for example, U.S. Pat. No. 6,501,934) and PTFE along with silica (see, for example, U.S. Pat. No. 6,326,111), which extend the life of the photoreceptor. However, silica filler in a charge transport layer typically has large porous areas that may cause deletion by trapping ozone and nitroxides.

U.S. Pat. No. 5,096,795 describes an electrophotographic imaging member comprising a charge transport layer comprised of a thermoplastic film forming binder, aromatic amine charge transport molecules and a homogeneous dispersion of at least one of organic and inorganic particles having a particle diameter less than about 4.5 µm, the particles comprising a material selected from the group consisting of microcrystalline silica, ground glass, synthetic glass spheres, diamond, corundum, topaz, polytetrafluoroethylene, and waxy polyethylene, wherein the particles do not decrease the optical transmittancy or photoelectric functioning of the layer. The particles provide coefficient of surface contact friction reduction, increased wear resistance, durability against tensile cracking, and improved adhesion of the layers without adversely affecting the optical and electrical properties of the imaging member.

U.S. Pat. No. 5,725,983 describes an electrophotographic imaging member including a supporting substrate having an electrically conductive layer, a hole blocking layer, an optional adhesive layer, a charge generating layer, a charge transport layer, an anticurl back coating, a ground strip layer and an optional overcoating layer, at least one of the charge transport layer, anticurl back coating, ground strip layer and the overcoating layer comprising a blend of inorganic and organic particles homogeneously distributed in a film forming matrix in a weight ratio of between about 3:7 and about 7:3, the inorganic particles and organic particles having a particle diameter less than about 4.5 µm.

Thus, attempts to utilize particles in outer layers of a photoreceptor in an effort to increase the hardness/durability of the outer photoreceptor layers have been made. However, these particles have been difficult to disperse uniformly in the materials typically used for certain layers of the imaging member, particularly the charge transport layer. When a charge transport layer is formed from a dispersion in which such particles are poorly dispersed, the imaging member exhibits lesser electrical performance and poorer print quality.

What is still desired, then, is an improved wear resistant photoreceptor, as well as a charge transport layer of an imaging member that forms an excellent dispersion when particle additives, particularly metal oxide nanoparticles, are included in the composition.

SUMMARY OF THE INVENTION

It is a feature of the present invention to provide a process of surface grafting metal oxide nanoparticles with a surface treatment agent such as a silane or a cyclic siloxane molecule.

It is another feature of the present invention to provide a composite composition comprised of a polymer binder and metal oxide nanoparticles, wherein said metal oxide nanoparticles are surface-attached with a surface treatment agent such as a silane or a siloxane molecule.

It is another feature of the present invention to provide a composite composition comprised of an aromatic polymer resin binder and metal oxide nanoparticles wherein said metal oxide nanoparticles are surface-attached with an arylsilane and/or arylsiloxane component having π—π interactions with said aromatic resin.

It is yet another feature of the present invention to provide a homogeneous dispersion and uniform coating from the composite composition of the surface grafted metal oxide nanoparticles and a polymer having aromatic components.

In a further embodiment, the invention relates to a process of forming a charge transport layer of a photoreceptor, and the charge transport layer so made, comprising dispersing the metal oxide nanoparticles having the surface treatment agent surface attached thereto in the polymer binder of the layer. In a still further embodiment, the invention relates to a photoreceptor including the charge transport layer as made by the aforementioned process, as well as to a xerographic device including the photoreceptor.

DETAILED DESCRIPTION OF PREFERRED EMBODIMENTS

The present inventors previously discovered that the use of nanocrystalline metal oxide particles, in particular nanocrystalline alumina particles, when dispersed in a charge transport layer of a photoreceptor of a xerographic device, could achieve a reduction of approximately four times in the wear rate of the photoreceptor as compared to a photoreceptor including a similar charge transport layer not containing the nanocrystalline alumina particles. However, the nanoparticles as dispersed in the charge transport layer exhibited agglomerate sizes of from about 500 nm to about 1 μm on average, much larger than the average primary particle size of the nanoparticles. These larger agglomerate sizes are believed to inhibit the improvement in the wear rate as well as negatively affect the electrical performance of the photoreceptor. Accordingly, the inventors sought, and have now discovered, a method of achieving metal oxide nanoparticles that can be stably dispersed in a hydrophobic polymer such as typically used in charge transport layers of photoreceptors and that have a smaller average dispersed particle size of from about 1 nm to about 250 nm.

Metal oxide nanoparticles are hydrophilic in general and readily disperse in polar media such as water, alcoholic solvents and hydrophilic polymers such as polyurethane. For example, alumina nanoparticles have been dispersed in polyurethane matrices in order to form scratch and abrasion resistant flooring surfaces.

However, in order to disperse the metal oxide nanoparticles in hydrophobic media such as non-polar solvents and hydrophobic polymers such as polycarbonates, it is necessary to modify the surface of the nanoparticles from hydrophilic to hydrophobic. Some treatments in this regard are known, for example as described in U.S. Pat. Nos. 5,695,900, 5,695,901, 5,993,967 and 6,033,781, all incorporated herein by reference in their entireties. The present inventors have found that although such treatments show some improvement in the dispersion quality of a charge transport layer and improvement in wear resistance of the charge transport layer as discussed above, the nanoparticles tend to form larger agglomerations, on the average size of from 500 nm to 1 μm, and tend to settle out of the dispersion over time.

The present invention thus provides a method of making metal oxide nanoparticles such that the nanoparticles do not form large agglomerates and also are stably dispersed in hydrophobic media.

As the metal oxide nanoparticles, any suitable metal oxide nanoparticle may be used. Examples include aluminum oxide (alumina), titanium oxide (dioxide) (titania), zinc oxide and iron oxide. Further examples include silicon oxide, cerium oxide, chromium oxide, zirconium oxide, tin oxide, magnesium oxide, manganese oxide, nickel oxide, copper oxide, indium tin oxide. Mixtures of metal oxides may also be used. The metal oxide nanoparticles may preferably be selected from the group consisting of γ-alumina, δ-alumina, α-alumina and a mixture of γ-alumina with a different form of alumina. For use in forming charge transport layers of a photoreceptor, alumina is preferred as the metal oxide material. The nanoparticles preferably have a primary particle size of any value or range within from about 1 to about 250 nm. For example, the nanoparticles may have an average size of from about 1 to about 199 nm, or from about 1 to about 175 nm, or from about 1 to about 150 nm, or from about 1 to about 100 nm, or from about 10 to about 100 nm, or from about 1 to about 50 nm.

Most preferably, the metal oxide nanoparticles are aluminum oxide particles. One example of suitable aluminum oxide nanoparticles are commercially available NanoTek® alumina particles available from Nanophase. NanoTek alumina nanoparticles are non-porous, highly crystalline with at least 50 percent of γ-type crystalline structure, spherical particles with a high surface area and a high chemically purity. When dispersed in a polymer binder, NanoTek alumina particles have extremely high surface area to unit volume ratio, and thus have a larger interaction zone with the dispersing medium.

The nanoparticles may be made by any suitable process without limitation. However, the nanoparticles may preferably be made by plasma synthesis or vapor phase synthesis. Such methods are different from other methods (particularly hydrolytic methods) in that the particles prepared by vapor phase synthesis are non-porous as evidenced by their relatively low BET values. In embodiments, the nanoparticles preferably have a BET value of from about 1 to about 75, more preferably from about 20 to about 40, most preferably of about 42 $m^2/g$. Nanoparticles prepared by plasma reaction or by vapor phase synthesis exhibit very high purity and very low porosity. In plasma reaction, in a high vacuum flow reactor, a metal rod or wire is irradiated to produce intense heating creating plasma-like conditions. Metal atoms are boiled off and carried downstream where they are quenched and quickly cooled by a reactant gas, most notably oxygen, to produce spherical low porosity nano-sized metal oxide particles. Particle properties and size are controlled by the temperature profiles in the reactor as well as the concentration of the quench gas. The high chemical purity and non-porosity may be especially important when the application of the particles is in the optoelectrical fields.

In the process of modifying the metal oxide nanoparticles so that the surface is hydrophobic, a first step in the process is to form a mixture of the metal oxide nanoparticles, a solvent, and a surface treatment agent.

As the solvent, although any solvent may be used, it is most preferred to use a non-polar solvent, preferably a high boiling point inert non-polar solvent. Examples of suitable solvents include dodecane, hexadecane, tridecane, ISOPAR (isoparaffinic hydrocarbons), toluene, xylene, chlorobenzene, dichlorobezene, mixtures thereof, and the like.

In general, the invention relates to treated metal oxide nanoparticles wherein organic moieties of the surface treatment agent on the surface of the treated metal oxide nanoparticles have π—π interaction with the aromatic components of the hydrophobic aromatic polymer binder. Example organic moieties in this regard may be selected from the group consisting of phenyl, totyl, naphthyl, benzyl, fluorophenyl, bromophenyl, chlorophenyl, phenylethyl and cyanophenyl. As the surface treatment agents, the metal oxide particles are preferably surface-attached with a silane or a siloxane molecule that can form π—π interaction with the aromatic components of the binder polymers. π—π interactions are known as a type of attractive non-covalent bonding interaction. Further, the surface treatment agents preferably have the effect of rendering the surface of the metal oxide nanoparticles hydrophobic.

As the surface treatment agent, agents such as silanes and siloxanes may be used, as well as organochlorosilanes, organosilane ethers or their titanium analogs. The surface treatment agents preferably have a structure represented by the formula of (I)

$$R-Z(X)_nY_{3-n} \quad (I)$$

wherein R and X each independently represents an alkyl group, an aryl group, a substituted alkyl group or a substituted aryl group, an organic group containing carbon—carbon double bond, carbon—carbon triple bond, and epoxy-group, Z represents a silicon atom, titanium atom, aluminum atom, zirconium atom and the like, and Y represents a hydrogen atom, a halogen atom, a hydroxyl group, an alkoxy group, and an allyl group, and n is an integer of from 0 to 3.

Most preferably, the surface treatment agent is represented by formula (II)

$$R-Si(X)_nY_{3-n} \quad (II)$$

wherein R and X each independently represents an alkyl group, an aryl group, a substituted alkyl group or a substituted aryl group, an organic group containing carbon—carbon double bond, carbon—carbon triple bond, and epoxy-group, and Y represents a hydrogen atom, a halogen atom, a hydroxyl group, an alkoxy group, and an allyl group, and n is an integer of from 0 to 3.

In embodiments, typical examples of R and X include alkyl groups containing from about 1 carbon atom to about 30 carbon atoms such as methyl, ethyl, propyl, iso-propyl, butyl, sec-butyl, tert-butyl, pentyl, hexyl, heptyl, octyl, dodecyl, cyclohexyl and the like, halogen substituted alkyl groups containing from about 1 to about 30 carbon atoms such as chloromethylene, trifluoropropyl, tridecafluoro-1,1,2,2-tetrahydrooctyl and the like. R may comprise aryl groups containing from about 6 to about 60 carbon atoms such as phenyl, alkylphenyl, biphenyl, benzyl, phenylethyl, and the like; halogen substituted aryl groups containing from about 6 to about 60 carbon atoms such as chlorophenyl, fluorophenyl, perfluorophenyl and the like; hydroxyl substituted aryl groups containing from about 6 to about 60 carbon atoms such as phenol, naphthol, cresol, binaphthal and the like; alkyl substituted aryl groups of from about 7 to about 60 carbon atoms such as methyl, ethyl, propyl, and the like; aryl groups containing nitrogen atoms such as cynide substituted aryl and amino substituted aryl groups, and five or six membered aromatic groups containing nitrogen atom(s); an organic group containing carbon—carbon double bond(s) of from about 1 to about 30 carbon atoms, such as γ-acryloxypropyl group, γ-methacryloxypropyl group and vinyl group; an organic group containing carbon—carbon triple bond(s) of from about 1 to about 30 carbon atoms, such as acetylenyl and the like; an organic group containing epoxy group such γ-glycidoxypropyl group and β-(3,4-epoxycyclohexyl)ethyl group and the like.

In embodiments, typical examples of Y include a hydrogen atom, a halogen atom such as chlorine, bromine, and fluorine; a hydroxyl group; an alkoxy group such as methoxy, ethoxy, iso-propoxy and the like; and an allyl group.

In embodiments, specific examples of surface treatment agents are selected from a group consisting of methyltrimethoxysilane, ethyltrimethoxysilane, methyltriethoxysilane, propyltrimethoxysilane, octyltrimethyoxysilane, trifluoropropyltrimethoxysilane, tridecafluoro-1,1,2,2-tetrahydrooctyltirmethoxysilane, p-tolyltrimethoxysilane, phenyltrimethoxysilane, phenylethyltrimethoxysilane, benzyltrimethoxysilane, diphenyldimethoxysilane, dimethyldimethoxysilane, bromophenylsilane, cyanophenylsilane, fluorophenylsilane, diphenyldisilanol, cyclohexylmethyldimethoxysilane, vinyl trimethoxysilane, 3-glycidoxyproplytrimethoxy-silane, 3-(trimethoxysilyl)propyl-methacrylate, and mixtures thereof.

In the present invention, the metal oxide nanoparticles may also be surface-attached with a cyclic siloxane of formula (III)

wherein $R^1$ and $R^2$ each independently represents an alkyl group of from about 1 to about 30 carbon atoms, an aryl group of from about 6 to about 60 carbon atoms, and a substituted alkyl group or a substituted aryl group of from about 1 to about 30 carbon atoms, and z represents an integer of from about 3 to about 10.

Specific examples of suitable cyclic siloxanes include hexamethylcyclotrisiloxane, 2,4,6-trimethyl-2,4,6-triphenylcyclotrisiloxane, 2,4,6,8-tetramethyl-2,4,6,8-tetraphenylcyclotetrasiloxane, hexaphenylcyclotrisiloxane, octamethylcyclotetrasiloxane, octaphenylcyclotetrasiloxane, and 2,4,6,8-tetramethyl-2,4,6,8-tetravinylcyclotetrasiloxane.

Most preferably when the metal oxide nanoparticles are to be used as a dispersion within a layer that is comprised of an aromatic resin, the metal oxide nanoparticles are surface-attached with an arylsilane or arylsiloxane component having π—π interactions with the aromatic resin. In this case, the typical aryl group in the silane or siloxane molecule is selected from a group consisting of phenyl, naphthyl, benzyl, phenylalkyl and the like. The aryl group may also include substituted aromatic functionality, such as hydroxyl, methyl, halogen, cyanide and the like.

In a preferred embodiment of the invention, when the metal oxide nanoparticles are selected from the group consisting of γ-alumina, δ-alumina, α-alumina and a mixture of γ-alumina with a different form of alumina, the surface treatment agent is then preferably selected from the group consisting of phenyltrimethoxysilane, benzyltrimethoxysilane, p-tolyltrimethoxysilane, phenylethyltrimethoxysilane, diphenyldimethoxysilane, diphenyldisilanol, fluorophenyltrimethoxysilane, cyanophenyltrimethoxysilane, bromophenyltrimethoxysilane, phenyltrimethoxysilane, and mixtures thereof, and the solvent is preferably selected from the group consisting of hydrocarbons having a boiling point ranging from 80 to 250° C. and chlorinated hydrocarbons having a boiling point ranging from 80 to 250° C.

The metal oxide nanoparticles, solvent and surface treatment agent may be subjected to any suitable mixing to form a well-dispersed mixture. In one preferred embodiment of the present invention, such mixing may be conducted by sonication. For this, any suitable and/or commercially available sonication equipment may be used without limitation. The sonication is conducted for a suitable length of time, for example from about 1 minute to about 120 minutes per 10 grams particles, preferably from about 10 minutes to about 60 minutes per 10 grams particles. The amount of surface treatment agent in the mixture may be from about 1 to about 50 weight percent to the amount of particles in the mixture, preferably from about 3 to about 25 weight percent to the amount of particles.

During, following, or both during and following mixing, the mixture is preferably heated to a temperature of at least about 80° C., preferably from about 100° C. to about 250° C., more preferably from about 100° C. to about 220° C., for an extended period of time such as about at least 1 hour, preferably from about 1 to about 24 hours, preferably from about 3 hours to about 14 hours. The higher temperature allows reaction and passivation of the nanoparticle surface. This heating step allows the silane treating agent to effect the conversion of the surfaces of the metal oxide nanoparticles to hydrophobic through attachment of the surface treatment agent to the nanoparticle.

Following the mixing and heating steps, the mixture is then cooled and the treated metal oxide nanoparticles are recovered. Any method of cooling and recovery may be used. In a preferred embodiment, the recovery is accomplished by removing the nanoparticles from the solvent, for example by subjecting the mixture to evaporation, filtration or centrifugation. The recovered metal oxide nanoparticles are preferably subjected to a cleaning and drying step, wherein the cleaning is preferably accomplished using a solvent having a lower boiling point than used in the mixture, for example acetone, tetrahydrofuran, hexane, heptane and the like, and the drying is at an elevated temperature for a suitable period of time, for example at a temperature of at least about 50° C., preferably about 50° C. to about 200° C., more preferably from about 80° C. to about 160° C.

The amount of surface treatment obtained can be ascertained by thermal gravimetric analysis. Generally, an about 1 to about 10% weight increase is observed in the nanoparticles, indicating successful surface treatment.

The treated metal oxide nanoparticles have a hydrophobic surface as discussed above. Thus, the treated metal oxide nanoparticles having the surface treatment agent surface attached thereto may be dispersed in a hydrophobic medium, for example a hydrophobic polymer matrix. As such a matrix, mention may be made of aromatic polymers such as polycarbonate, polyester, polyether, polyimide, polyamide, polysulfone, vinyl polymer and the like. Hydrophobic polymers such as may be used in a charge transport layer of a photoreceptor may be listed, e.g., a polycarbonate polymer. Suitable specific examples of polycarbonate polymers include bisphenol Z polycarbonates (PCZ), in particular selected from the group consisting of PCZ-800, PCZ-500, PCZ-400 and mixtures thereof.

A composite layer formed from the hydrophobic polymer matrix having the treated metal oxide nanoparticles therein may be used in any application without restriction. Preferably, the nanoparticles are included in the polymer in an amount of from about 2 to about 80% by weight of the composition. In a preferred embodiment of the present invention, however, the layer is a charge transport layer of a photoreceptor of an electrophotographic device.

Evaluation of the metal oxide nanoparticles as made by the method of the present invention in a dispersion with a hydrophobic material has revealed that the metal oxide nanoparticles exhibit much smaller particle domains as compared with prior treated metal oxide nanoparticles. Specifically, the treated metal oxide nanoparticles of the invention exhibit a particle domain size of about 20 to about 250 nm, preferably about 30 to about 100 nm, on average. As a result, the nanoparticles of the invention are much more stably dispersed in the hydrophobic medium. When the dispersed composition is used as a charge transport layer of a photoreceptor, the composition exhibits an improved wear rate, as well as an improved electrical performance, as compared to prior charge transport layers including metal oxide nanoparticles of larger agglomerate size. The composites of metal oxide nanoparticles in a polymer matrix, especially the nanocomposite of nano-sized metal oxide particles, are able to improve the mechanical properties of materials, especially to increase marring, scratching, abrasion and wearing resistance. A composite charge transport layer prepared using the nanoparticles of the invention have a uniform coating and exhibit superior abrasion resistance and excellent electrical performance of photoreceptor devices. A charge transport layer formed with untreated alumina particles shows poor electrical performance, namely very high residual potential.

When added to a charge transport layer composition, the composition must include, in addition to the treated metal oxide nanoparticles and the at least one hydrophobic polymer, at least one charge transport molecule. Any suitable charge transport molecules may be used in the art without limitation. The charge transport molecules are preferably non-polymeric small molecule charge transport molecules that are soluble or dispersible on a molecular scale in the hydrophobic polymer binder. In embodiments, the charge transport molecule is selected from the group consisting of diamines, aromatic amines, pyrazolines, substituted fluorenes, oxadiazoles, hydrazones, carbazole phenyl hydrazones, tri-substituted methanes and mixtures thereof. In particular, the charge transport molecule is selected from the group consisting of N,N'-diphenyl-N,N'-bis(alkylphenyl)-[1,1'-biphenyl]-4,4'-diamine, wherein the alkyl contains from about 1 to 20 carbons; N,N,N',N'-tetraphenyl-[2,2'-dimethyl-1,1'-biphenyl]-4,4'-diamine; N,N,N',N'-tetra(4-methylphenyl)-[2,2'-dimethyl-1,1'-biphenyl]-4,4'-diamine; N,N'-diphenyl-N,N'-bis(4-methylphenyl)[2,2'-dimethyl-1,1'-biphenyl]-4,4'-diamine; N,N'-diphenyl-N,N'-bis(2-methylphenyl)-[2,2'-dimethyl-1,1'-biphenyl]-4,4'-diamine; N,N'-diphenyl-N,N'-bis(3-methylphenyl)-[2,2'-dimethyl-1,1'-biphenyl]-4,4'-diamine; N,N'-diphenyl-N,N'-bis(3-methylphenyl)-pyrenyl-1,6-diamine; N,N'-bis-(3-methoxyphenyl)-N,N'-diphenylbiphenyl-4,4'-diamine (HCT-305 from Hodagaya); bis(4-diethylamine-2-methylphenyl)phenylmethane; 4'-4''-bis(diethylamino)-2',2''-dimethyltriphenylmethane; N,N'-diphenyl-N,N'-bis(3-chlorophenyl)-[1,1'-biphenyl]-4,4'-diamine; N,N'-diphenyl-N,N'-bis(4-chlorophenyl)-[1,1'-biphenyl]-4,4'-diamine, 1-[lepidyl-(2)]-3-(p-diethylaminophenyl)-5-(p-diethylaminophenyl)pyrazoline; 1-[quinolyl-(2)]-3-(p-diethylaminophenyl)-5-(p-diethylaminophenyl)pyrazoline; 1-[pyridyl-(2)]-3-(p-diethylaminostyryl)-5-(p-diethylaminophenyl) pyrazoline; 1-[6-methoxypyridyl-(2)]-3-(p-diethylaminostyryl)-5-(p-diethyl aminophenyl)pyrazoline; 1-phenyl-3-[p-dimethylaminostyryl]-5-(p-dimethylaminostyryl)pyrazoline; 1-phenyl-3-[p-diethylaminostyryl]-5-(p-diethylaminostyryl)pyrazoline; 9-(4'-dimethylaminobenzylidene)fluorene; 9-(4'-methoxybenzylidene)fluorene; 9-(2'4'-dimethoxybenzylidene)fluorene; 2-nitro-9-benzylidene-fluorene; 2-nitro-9-(4'-diethylaminobenzylidene) fluorene; 2,5-bis(4-diethylaminophenyl)-1,3,4-oxadiazole; pyrazoline; imidazole; triazole; p-diethylaminobenzaldehyde-(diphenylhydrazone); o-ethoxy-p-diethylaminobenzaldehyde-(diphenylhydrazone); o-methyl-p-diethylaminobenzaldehyde-(diphenylhydrazone); o-methyl-p-dimethylaminobenzaldehyde-(diphenylhydrazone); p-dipropylaminobenzaldehyde-(diphenylhydrazone); p-diethylaminobenzaldehyde-(benzylphenylhydrazone); p-dibutylaminobenzaldehyde-(diphenylhydrazone); p-dimethylaminobenzaldehyde-(diphenylhydrazone); 1-naphthalenecarbaldehyde 1-methyl-1-phenylhydrazone; 1-naphthalenecarbaldehyde 1,1-phenylhydrazone; 4-methoxynaphthlene-1-carbaldehyde 1-methyl-1-phenylhydrazone; 9-methylcarbazole-3-carbaldehyde-1,1-diphenylhydrazone; 9-ethylcarbazole-3-carbaldehyde-1-methyl-1-phenylhydrazone; 9-ethylcarbazole-3-carbaldehyde-1-ethyl-1-phenylhydrazone; 9-ethylcarbazole-3-carbaldehyde-1-ethyl-1-benzyl-1-phenylhydrazone; 9-ethylcarbazole-3-carbaldehyde-1,1-diphenylhydrazone and mixtures thereof.

The treated metal oxide nanoparticles are added to the charge transport layer composition in amounts such that the resulting layer includes from, for example, about 2 to about 15% by weight, preferably from about 3 to about 10% by weight, of the metal oxide nanoparticles.

The charge transport layer composition may be formed by any suitable method. Preferably, the metal oxide nanoparticles are dispersed in the composition by first dispersing the nanoparticles in a solvent of the composition, e.g., toluene or methylchlorobenzene, preferably with sonication, to form a pre-dispersion. The pre-dispersion is then added to the composition of the at least one hydrophobic polymer and the at least one charge transport molecule, optionally also including any additional components or additives as may be desired or required for a given application. The composition preferably includes from about 25 to about 60% by weight of the at least one charge transport molecule and from about 40 to about 75% by weight of the at least one hydrophobic binder.

The other layers of the photoreceptor will next be explained. It should be emphasized that it is contemplated that the invention covers any photoreceptor structure so long as the charge transport layer has the composition described above. Any suitable multilayer photoreceptors may be employed in the imaging member of this invention. The charge generating layer and charge transport layer as well as the other layers may be applied in any suitable order to produce either positive or negative charging photoreceptors. For example, the charge generating layer may be applied prior to the charge transport layer, as illustrated in U.S. Pat. No. 4,265,990, or the charge transport layer may be applied prior to the charge generating layer, as illustrated in U.S. Pat. No. 4,346,158, the entire disclosures of these patents being incorporated herein by reference. Most preferably, however, the charge transport layer is employed upon a charge generating layer, and the charge transport layer may optionally be overcoated with an overcoat layer.

A photoreceptor of the invention employing the charge transport layer may comprise an optional anti-curl layer, a substrate, an optional hole blocking layer, an optional adhesive layer, a charge generating layer, the charge transport layer, and an optional overcoat layer.

The photoreceptor substrate may comprise any suitable organic or inorganic material known in the art. The substrate can be formulated entirely of an electrically conductive material, or it can be an insulating material having an electrically conductive surface. The substrate is of an effective thickness, generally up to about 100 mils, and preferably from about 1 to about 50 mils, although the thickness can be outside of this range. The thickness of the substrate layer depends on many factors, including economic and mechanical considerations. Thus, this layer may be of substantial thickness, for example over 100 mils, or of minimal thickness provided that there are no adverse effects on the system. Similarly, the substrate can be either rigid or flexible. The substrate can be opaque or substantially transparent and can comprise numerous suitable materials having the desired mechanical properties. The entire substrate can comprise the same material as that in the electrically conductive surface or the electrically conductive surface can be merely a coating on the substrate. Any suitable electrically conductive material can be employed. Typical electrically conductive materials include copper, brass, nickel, zinc, chromium, stainless steel, conductive plastics and rubbers, aluminum, semitransparent aluminum, steel, cadmium, silver, gold, zirconium, niobium, tantalum, vanadium, hafnium, titanium, nickel, chromium, tungsten, molybdenum, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. When the selected substrate comprises a nonconductive base and an electrically conductive layer coated thereon, the substrate can be of any other conventional material, including organic and inorganic materials. Typical substrate materials include insulating non-conducting materials such as various resins known for this purpose including polycarbonates, polyamides, polyurethanes, paper, glass, plastic, polyesters such as MYLAR (available from Du Pont) or MELINEX 447 (available from ICI Americas, Inc.), and the like. The conductive layer can be coated onto the base layer by any suitable coating technique, such as vacuum deposition or the like. If desired, the substrate can comprise a metallized plastic, such as titanized or aluminized MYLAR, wherein the metallized surface is in contact with the photogenerating layer or any other layer situated between the substrate and the photogenerating layer. The coated or uncoated substrate can be flexible or rigid, and can have any number of configurations, such as a plate, a cylindrical drum, a scroll, an endless flexible belt, or the like. The outer surface of the substrate may comprise a metal oxide such as aluminum oxide, nickel oxide, titanium oxide, or the like.

A hole blocking layer may then optionally be applied to the substrate. Generally, electron blocking layers for positively charged photoreceptors allow the photogenerated holes in the charge generating layer at the top of the photoreceptor to migrate toward the charge (hole) transport layer below and reach the bottom conductive layer during the electrophotographic imaging processes. Thus, an electron blocking layer is normally not expected to block holes in positively charged photoreceptors such as photoreceptors coated with a charge generating layer over a charge (hole) transport layer. For negatively charged photoreceptors, any suitable hole blocking layer capable of forming an electronic barrier to holes between the adjacent photoconductive layer and the underlying zirconium or titanium layer may be utilized. A hole blocking layer may comprise any suitable material. Typical hole blocking layers utilized for the negatively charged photoreceptors may include, for example, polyamides such as LUCKAMIDE (a nylon-6 type material derived from methoxymethyl-substituted polyamide), hydroxy alkyl methacrylates, nylons, gelatin, hydroxyl alkyl cellulose, organopolyphosphazenes, organosilanes, organotitanates, organozirconates, silicon oxides, zirconium oxides, and the like. Preferably, the hole blocking layer comprises nitrogen containing siloxanes. Typical nitrogen containing siloxanes are prepared from coating solutions containing a hydrolyzed silane. Typical hydrolyzable silanes include 3-aminopropyl triethoxy silane, (N,N'-dimethyl 3-amino) propyl triethoxysilane, N,N-dimethylamino phenyl triethoxy silane, N-phenyl aminopropyl trimethoxy silane, trimethoxy silylpropyldiethylene triamine and mixtures thereof.

The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. This siloxane coating is described in U.S. Pat. No. 4,464,450, the disclosure thereof being incorporated herein in its entirety. After drying, the siloxane reaction product film formed from the hydrolyzed silane contains larger molecules. The reaction product of the hydrolyzed silane may be linear, partially crosslinked, a dimer, a trimer, and the like.

The siloxane blocking layer should be continuous and have a thickness of less than about 0.5 micrometer because greater thicknesses may lead to undesirably high residual voltage. A blocking layer of between about 0.005 micrometer and about 0.3 micrometer (50 Angstroms to 3,000 Angstroms) is preferred because charge neutralization after the exposure step is facilitated and optimum electrical performance is achieved. A thickness of between about 0.03 micrometer and about 0.06 micrometer is preferred for zirconium and/or titanium oxide layers for optimum electrical behavior and reduced charge deficient spot occurrence and growth.

An adhesive layer may optionally be applied to the hole blocking layer. The adhesive layer may comprise any suitable film forming polymer. Typical adhesive layer materials include, for example, copolyester resins, polyarylates, polyurethanes, blends of resins, and like. A preferred copolyester resin is a linear saturated copolyester reaction product of four diacids and ethylene glycol. The molecular structure of this linear saturated copolyester in which the mole ratio of diacid to ethylene glycol in the copolyester is 1:1. The diacids are terephthalic acid, isophthalic acid, adipic acid and azelaic acid. The mole ratio of terephthalic acid to isophthalic acid to adipic acid to azelaic acid is 4:4:1:1. A representative linear saturated copolyester adhesion promoter of this structure is commercially available as Mor-Ester 49,000 (available from Morton International Inc., previously available from Du Pont de Nemours & Co.). Typical polyester resins are commercially available and include, for example, VITEL PE-100, VITEL PE-200, VITEL PE-200D, and VITEL PE-222; all available from Goodyear Tire and Rubber Co.

Alternatively, the adhesive interface layer may comprise polyarylate (ARDEL D-100, available from Amoco Performance Products, Inc.), polyurethane or a polymer blend of these polymers with a carbazole polymer. Adhesive layers are well known and described, for example in U.S. Pat. Nos. 5,571,649, 5,591,554, 5,576,130, 5,571,648, 5,571,647 and 5,643,702, the entire disclosures of these patents being incorporated herein by reference.

Any suitable solvent may be used to form an adhesive layer coating solution. Typical solvents include tetrahydrofuran, toluene, hexane, cyclohexane, cyclohexanone, methylene chloride, 1,1,2-trichloroethane, monochlorobenzene, and the like, and mixtures thereof. Any suitable technique may be utilized to apply the adhesive layer coating. Typical coating techniques include extrusion coating, gravure coating, spray coating, wire wound bar coating, and the like. The adhesive layer is applied directly to the charge blocking layer. Thus, the adhesive layer of this invention is in direct contiguous contact with both the underlying charge blocking layer and the overlying charge generating layer to enhance adhesion bonding and to effect ground plane hole injection suppression. Drying of the deposited coating may be effected by any suitable conventional process such as oven drying, infra red radiation drying, air drying and the like. The adhesive layer should be continuous. Satisfactory results are achieved when the adhesive layer has a thickness between about 0.03 micrometer and about 2 micrometers after drying.

The photogenerating layer may comprise single or multiple layers comprising inorganic or organic compositions and the like. One example of a generator layer is described in U.S. Pat. No. 3,121,006, the disclosure of which is totally incorporated herein by reference, wherein finely divided particles of a photoconductive inorganic compound are dispersed in an electrically insulating organic resin binder. Multiphotogenerating layer compositions may be utilized where a photoconductive layer enhances or reduces the properties of the photogenerating layer.

The charge generating layer of the photoreceptor may comprise any suitable photoconductive particle dispersed in the hydrophobic film forming binder. Typical photoconductive particles include, for example, phthalocyanines such as metal free phthalocyanine, copper phthalocyanine, titanyl phthalocyanine, hydroxygallium phthalocyanine, vanadyl phthalocyanine and the like, perylenes such as benzimidazole perylene, trigonal selenium, quinacridones, substituted 2,4-diamino-triazines, polynuclear aromatic quinones, and the like. Especially preferred photoconductive particles include hydroxygallium phthalocyanine, chlorogallium phthalocyanine, benzimidazole perylene and trigonal selenium.

Examples of suitable binders for the photoconductive materials include thermoplastic and thermosetting resins such as polycarbonates, polyesters, including polyethylene terephthalate, polyurethanes, polystyrenes, polybutadienes, polysulfones, polyarylethers, polyarylsulfones, polyethersulfones, polycarbonates, polyethylenes, polypropylenes, polymethylpentenes, polyphenylene sulfides, polyvinyl acetates, polyvinylbutyrals, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchlorides, polyvinyl alcohols, poly-N-vinylpyrrolidinone)s, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazoles, and the like. These polymers may be block, random or alternating copolymers.

When the photogenerating material is present in a binder material, the photogenerating composition or pigment may be present in the film forming polymer binder compositions in any suitable or desired amounts. For example, from about 10 percent by volume to about 60 percent by volume of the photogenerating pigment may be dispersed in about 40 percent by volume to about 90 percent by volume of the film forming polymer binder composition, and preferably from about 20 percent by volume to about 30 percent by volume of the photogenerating pigment may be dispersed in about 70 percent by volume to about 80 percent by volume of the film forming polymer binder composition. Typically, the photoconductive material is present in the photogenerating layer in an amount of from about 5 to about 80 percent by weight, and preferably from about 25 to about 75 percent by weight, and the binder is present in an amount of from about 20 to about 95 percent by weight, and preferably from about 25 to about 75 percent by weight, although the relative amounts can be outside these ranges.

The photogenerating layer containing photoconductive compositions and the resinous binder material generally ranges in thickness from about 0.05 micron to about 10 microns or more, preferably being from about 0.1 micron to about 5 microns, and more preferably having a thickness of from about 0.3 micron to about 3 microns, although the thickness can be outside these ranges. The photogenerating layer thickness is related to the relative amounts of photogenerating compound and binder, with the photogenerating material often being present in amounts of from about 5 to about 100 percent by weight. Higher binder content compositions generally require thicker layers for photogeneration. Generally, it is desirable to provide this layer in a thickness sufficient to absorb about 90 percent or more of the incident radiation which is directed upon it in the imagewise or printing exposure step. The maximum thickness of this layer is dependent primarily upon factors such as mechanical considerations, the specific photogenerating compound selected, the thicknesses of the other layers, and whether a flexible photoconductive imaging member is desired.

The photogenerating layer can be applied to underlying layers by any desired or suitable method. Any suitable technique may be utilized to mix and thereafter apply the photogenerating layer coating mixture. Typical application techniques include spraying, dip coating, roll coating, wire wound rod coating, and the like. Drying of the deposited coating may be effected by any suitable technique, such as oven drying, infra red radiation drying, air drying and the like.

Optionally, an overcoat layer can also be utilized to improve resistance of the photoreceptor to abrasion. In some cases an anticurl back coating may be applied to the surface of the substrate opposite to that bearing the photoconductive layer to provide flatness and/or abrasion resistance where a web configuration photoreceptor is fabricated. These overcoating and anticurl back coating layers are well known in the art, and can comprise thermoplastic organic polymers or inorganic polymers that are electrically insulating or slightly semiconductive. Overcoatings are continuous and typically have a thickness of less than about 10 microns, although the thickness can be outside this range. The thickness of anticurl backing layers generally is sufficient to balance substantially the total forces of the layer or layers on the opposite side of the substrate layer. An example of an anticurl backing layer is described in U.S. Pat. No. 4,654,284, the disclosure of which is totally incorporated herein by reference. A thickness of from about 70 to about 160 microns is a typical range for flexible photoreceptors, although the thickness can be outside this range. An overcoat can have a thickness of at most 3 microns for insulating matrices and at most 6 microns for semi-conductive matrices. The use of such an overcoat can still further increase the wear life of the photoreceptor, the overcoat having a wear rate of 2 to 4 microns per 100 kilocycles, or wear lives of between 150 and 300 kilocycles.

The photoreceptor of the invention is utilized in a xerographic device for use in an electrophotographic imaging process. As explained above, such image formation involves first uniformly electrostatically charging the photoreceptor, then exposing the charged photoreceptor to a pattern of activating electromagnetic radiation such as light, which selectively dissipates the charge in the illuminated areas of the photoreceptor while leaving behind an electrostatic latent image in the non-illuminated areas. This electrostatic latent image may then be developed to form a visible image by depositing finely divided electroscopic toner particles, for example from a developer composition, on the surface of the photoreceptor. The resulting visible toner image can be transferred to a suitable receiving member such as paper.

The photoreceptor may be charged by any well known method in the art.

The invention will now be further explained by way of the following examples.

EXAMPLE I

Attaching Phenyltrimethoxysilane to Alumina Surface

NanoTek alumina particles (10 g) were dispersed in dodecane (100 g) containing phenyltrimethoxysilane (1 g) with a probe sonicator (525 w) for 10 minutes. The resulting dispersion was then heated at 200° C. in a flask with a mechanical stir for 12 hours. After cooling to room temperature (25° C.), the dispersion was centrifuged and the top layer was removed by decantation. The remaining solids were dispersed in hexane (100 mL) by sonication and centrifugation and decantation to remove the top layer. The process was repeated twice. The resulting surface treated alumina particles were dried at 120° C. for 12 hours.

EXAMPLE II

Attaching Methyltrimethoxysilane to Alumina Surface

NanoTek alumina particles (10 g) were dispersed in dodecane (100 g) containing methyltrimethoxysilane (1 g) with a probe sonicator (525 w) for 10 minutes. The resulting dispersion was then heated at 200° C. in a flask with a mechanical stir for 12 hours. After cooling to room temperature (25° C.), the dispersion was centrifuged and the top layer was removed by decantation. The remaining solids were dispersed in hexane (100 mL) by sonication and centrifugation and decantation to remove the top layer. The process was repeated twice. The resulting surface treated alumina particles were dried at 120° C. for 12 hours.

EXAMPLE III

Attaching Octyltrimethoxysilane to Alumina Surface

NanoTek alumina particles (10 g) were dispersed in dodecane (100 g) containing octyltrimethoxysilane (1 g) with a probe sonicator (525 w) for 10 minutes. The resulting dispersion was then heated at 200° C. in a flask with a mechanical stir for 12 hours. After cooling to room temperature (25° C.), the dispersion was centrifuged and the top layer was removed by decantation. The remaining solids were dispersed in hexane (100 mL) by sonication and centrifugation and decantation to remove the top layer. The process was repeated twice. The resulting surface treated alumina particles were dried at 120° C. for 12 hours.

EXAMPLE IV

Attaching Phenylethyltrimethoxysilane to Alumina Surface

NanoTek alumina particles (10 g) were dispersed in dodecane (100 g) containing phenylethyltrimethoxysilane (1 g) with a probe sonicator (525 w) for 10 minutes. The resulting dispersion was then heated at 200° C. in a flask with a mechanical stir for 12 hours. After cooling to room temperature (25° C.), the dispersion was centrifuged and the top layer was removed by decantation. The remaining solids were dispersed in hexane (100 mL) by sonication and centrifugation and decantation to remove the top layer. The process was repeated twice. The resulting surface treated alumina particles were dried at 120° C. for 12 hours.

EXAMPLE V

Preparation of Polycarbonate Nanocomposite

A dispersion was prepared by sonicating a mixture of the surface treated alumina particles of Example I (9 parts) and monochlorobenzene (410 parts) in a sonicator bath (Branson Ultrasonic Corporation Model 2510R-MTH) for about 30 to about 60 minutes. The resulting dispersion was mixed with a polycarbonate solution containing a polycarbonate, PCZ-400 [poly(4,4'-dihydroxy-diphenyl-1-1-cyclohexane), $M_w$=40,000] available from Mitsubishi Gas Chemical Company, Ltd. (102 parts) and tetrahydrofuran (410 parts). The resulting dispersion was roll-milled for an extended period of time (6 to 36 hours), then coated on a substrate by a draw bar coating technique. The coated composite film was dried at 120° C. for 30 minutes.

A composite film with untreated alumina was prepared by the same method. The following table compares TEM (Transmission electron microscopy) evaluation results of the coated composite films with treated and untreated alumina particles.

| Composite | Coating solution quality | Particle sizes in composite film (nm) |
|---|---|---|
| PCZ-400 with treated alumina | Stable dispersion | 10 to 100 |
| PCZ-400 with untreated alumina | Sedimentation | 500 to 1000 |

EXAMPLE VI

Composite Charge Transport Layer with 5 wt % Attached-Alumina

On a 75 micron thick titanized MYLAR® substrate was coated by draw bar technique a barrier layer formed from hydrolyzed gamma aminopropyltriethoxysilane having a thickness of 0.005 micron. The barrier layer coating composition was prepared by mixing 3-aminopropyltriethoxysilane with ethanol in a 1:50 volume ratio. The coating was allowed to dry for 5 minutes at room temperature, followed by curing for 10 minutes at 110° C. in a forced air oven. On top of the blocking layer was coated a 0.05 micron thick adhesive layer prepared from a solution of 2 weight percent of a DuPont 49K (49,000) polyester in dichloromethane. A 0.2 micron photogenerating layer was then coated on top of the adhesive layer with a wire wound rod from a dispersion of hydroxygallium phthalocyanine Type V (22 parts) and a vinyl chloride/vinyl acetate copolymer ($M_n$=27,000, about 86 weight percent of vinyl chloride, about 13 weight percent of vinyl acetate and about 1 weight percent of maleic acid) available from Dow Chemical (18 parts), in 960 parts of n-butylacetate, followed by drying at 100° C. for 10 minutes. Subsequently, a 24 μm thick charge transport layer (CTL) was coated on top of the photogenerating layer by a draw bar from a dispersion of phenyltrimethoxysilane surface grafted alumina particles (9 parts) prepared from Example I, N,N'-diphenyl-N,N-bis(3-methylphenyl)-1,1'-biphenyl-4,4'-diamine (67.8 parts), 1.7 parts of 2,6-di-tert-butyl-4methylphenol (BHT) from Aldrich and a polycarbonate, PCZ-400 [poly(4,4'-dihydroxy-diphenyl-1-1-cyclohexane), $M_w$=40,000] available from Mitsubishi Gas Chemical Company, Ltd. (102 parts) in a mixture of 410 parts of tetrahydrofuran (THF) and 410 parts of monochlorobenzene. The CTL was dried at 115° C. for 60 minutes.

The above dispersion with solid components of surface treated alumina particles of Example I was prepared by pre-dispersed alumina in a sonicator bath (Branson Ultrasonic Corporation Model 2510R-MTH) with monochlorobenzene and then added to the charge transport liquid to form a stable dispersion, and roll milled for an extended period of time (6 to 36 hours) before coating.

The xerographic electrical properties of the above prepared photoconductive imaging member and other similar members can be determined by known means, including electrostatically charging the surfaces thereof with a corona discharge source until the surface potentials, as measured by a capacitively coupled probe attached to an electrometer, attained an initial value Vo of about −800 volts. After resting for 0.5 second in the dark, the charged members attained a surface potential of Vddp, dark development potential. Each member was then exposed to light from a filtered Xenon lamp thereby inducing a photodischarge that resulted in a reduction of surface potential to a Vbg value, background potential. The percent of photodischarge was calculated as 100×(Vddp−Vbg)/Vddp. The desired wavelength and energy of the exposed light was determined by the type of filters placed in front of the lamp. The monochromatic light photosensitivity was determined using a narrow band-pass filter. The photosensitivity of the imaging member is usually provided in terms of the amount of exposure energy in ergs/cm², designated as $E_{1/2}$, required to achieve 50 percent photodischarge from Vddp to half of its initial value. The higher the photosensitivity, the smaller is the $E_{1/2}$ value. The $E_{7/8}$ value corresponds to the exposure energy required to achieve 7/8 photodischarge from Vddp. The device was finally exposed to an erase lamp of appropriate light intensity and any residual potential (Vresidual) was measured. The imaging members were tested with an monochromatic light exposure at a wavelength of 780+/−10 nanometers and an erase light with the wavelength of 600 to 800 nanometers and intensity of 200 ergs/cm².

The devices were then mounted on a wear test fixture to determine the mechanical wear characteristics of each device. Photoreceptor wear was determined by the change in thickness of the photoreceptor before and after the wear test. The thickness was measured, using a permascope at one-inch intervals from the top edge of the coating along its length using a permascope, ECT-100. All of the recorded thickness values are averaged to obtain the average thickness of the entire photoreceptor device. For the wear test, the photoreceptor was wrapped around a drum and rotated at a speed of 140 rpm. A polymeric cleaning blade was brought into contact with the photoreceptor at an angle of 20 degrees and a force of approximately 60–80 grams/cm. Single component toner was trickled on the photoreceptor at rate of 200 mg/min. The drum was rotated for 150 k cycle during a single test. The wear rate is equal to the change in thickness before and after the wear test divided by the number of kcycles.

A control device was prepared by the same method containing no alumina particles in the CTL.

| Device | Vddp (−V) | $E_{1/2}$ (Ergs/cm)$^2$ | Dark Decay (V @ 500 ms) | Vr (V) | Wear (nm/k cycles) |
|---|---|---|---|---|---|
| Control Device Without Al$_2$O$_3$ | 811 | 1.94 | 14 | 11.2 | 41.5 |
| Device with Al$_2$O$_3$ | 816 | 1.77 | 20 | 3.7 | 15.2 |

The invention thus enables the formation of metal oxide nanoparticles that may be readily and stably dispersed in hydrophobic media. When such composition is formed into a charge transport layer of a photoreceptor, the invention enables the formation of charge transport layers of improved wear rate and electrical performance.

While the invention has been described in conjunction with exemplary embodiments, these embodiments should be viewed as illustrative, not limiting. Various modifications, substitutes, or the like are possible within the spirit and scope of the invention.

What is claimed is:

1. A process of making treated metal oxide nanoparticles, comprising mixing metal oxide nanoparticles, a solvent, and a surface treatment agent,
wherein the surface treatment agent has a structure represented by formula (I)

$$R\text{-}Z(X)_n Y_{3-n} \quad\quad (I)$$

wherein R and X each independently represents an alkyl group containing from about 1 carbon atom to about 30 carbon atoms, an aryl group containing from about 6 to about 60 carbon atoms, a substituted alkyl group containing from about 1 to about 30 carbon atoms or a substituted aryl group containing from about 6 to about 60 carbon atoms, an organic group containing of from about 1 to about 30 carbon atoms and a carbon—carbon double bond or a carbon—carbon triple bond, and epoxy-group, Z represents a silicon atom, titanium atom, aluminum atom or zirconium atom, and Y represents a hydrogen atom, a halogen atom, a hydroxyl group, an alkoxy group, or an allyl group, and n is an integer of from 0 to 3, or wherein the surface treatment agent has a structure represented by formula (III)

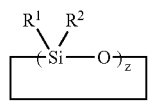

wherein $R^1$ and $R^2$ each independently represents an alkyl group of from about 1 to about 30 carbon atoms, an aryl group of from about 6 to about 60 carbon atoms, and a substituted alkyl group or a substituted aryl group of from about 1 to about 30 carbon atoms, and z represents an integer of from about 3 to about 10, and heating the mixture to a temperature of at least about 80° C. for a period of at least about 1 hour.

2. The process according to claim 1, wherein the surface treatment agent is selected from the group consisting of methyltrimethoxysilane, ethyltrimethoxysilane, methyltriethoxysilane, propyltrimethoxysilane, octyltrimethyoxysilane, trifluoropropyltrimethoxysilane, tridecafluoro-1,1,2,2-tetrahydrooctyltirmethoxysilane, p-tolyltrimethoxysilane, phenyltrimethoxysilane, phenylethyltrimethoxysilane, benzyltrimethoxysilane, diphenyldimethoxysilane, dimethyldimethoxysilane, bromophenylsilane, cyanophenylsilane, fluorophenylsilane, diphenyldisilanol, cyclohexylmethyldimethoxysilane, vinyltrimethoxysilane, 3-glycidoxyproplytrimethoxy-silane, 3-(trimethoxysilyl)propylmethacrylate, hexamethylcyclotrisiloxane, 2,4,6-trimethyl-2,4,6-triphenylcyclotrisiloxane, 2,4,6,8-tetramethyl-2,4,6,8-tetraphenylcyclotetrasiloxane, hexaphenylcyclotrisiloxane, octamethylcyclotetrasiloxane, octaphenylcyclotetrasiloxane, and 2,4,6,8-tetramethyl-2,4,6,8-tetravinylcyclotetrasiloxane.

3. The process according to claim 1, wherein the metal oxide nanoparticles are alumina nanoparticles.

4. The process according to claim 1, wherein the metal oxide nanoparticles are selected from the group consisting of γ-alumina, δ-alumina, α-alumina and a mixture of γ-alumina with a different form of alumina, wherein the surface treatment agent is selected from the group consisting of phenyltrimethoxysilane, benzyltrimethoxysilane, p-tolyltrimethoxysilane, phenylethyltrimethoxysilane, diphenyldimethoxysilane, diphenyldisilanol, fluorophenyltrimethoxysilane, cyanophenyltrimethoxysilane, bromophenyltrimethoxysilane, phenyltrimethoxysilane, and mixtures thereof, and wherein the solvent is selected from the group consisting of hydrocarbons having a boiling point ranging from 80 to 250° C. and chlorinated hydrocarbons having a boiling point ranging from 80 to 250° C.

5. A process of making treated metal oxide nanoparticles, comprising mixing metal oxide nanoparticles, a solvent, and a surface treatment agent, wherein the surface treatment agent is an arylsilane or arylsiloxane in which the aryl group contains from about 6 to about 60 carbon atoms.

6. A composition comprising a polymer binder having dispersed therein at least metal oxide nanoparticles that have surface attached thereto a surface treatment agent, wherein the surface treatment agent has a structure represented by formula (I)

$$R\text{-}Z(X)_n Y_{3-n} \quad\quad (I)$$

wherein R and X each independently represents an alkyl group containing from about 1 carbon atom to about 30 carbon atoms, an aryl group containing from about 6 to about 60 carbon atoms, a substituted alkyl group containing from about 1 to about 30 carbon atoms or a substituted aryl group containing from about 6 to about 60 carbon atoms, an organic group containing of from about 1 to about 30 carbon atoms and a carbon—carbon double bond or a carbon—carbon triple bond, and epoxy-group, Z represents a silicon atom, titanium atom, aluminum atom or zirconium atom, and Y represents a hydrogen atom, a halogen atom, a hydroxyl group, an alkoxy group, or an allyl group, and n is an integer of from 0 to 3, or wherein the surface treatment agent has a structure represented by formula (III)

wherein R¹ and R² each independently represents an alkyl group of from about 1 to about 30 carbon atoms, an aryl group of from about 6 to about 60 carbon atoms, and a substituted alkyl group or a substituted aryl group of from about 1 to about 30 carbon atoms, and z represents an integer of from about 3 to about 10, and wherein the polymer is selected from the group consisting of a polycarbonate, a polyester, a polyether, a polysulfone, a polyimide, a polyamide and a vinyl polymer.

7. The composition according to claim 6, wherein the metal oxide nanoparticles have an average size of from about 1 to about 250 nm.

8. The composition according to claim 6, wherein the surface treatment agent is selected from the group consisting of methyltrimethoxysilane, ethyltrimethoxysilane, methyltriethoxysilane, propyltrimethoxysilane, octyltrimethyoxysilane, trifluoropropyltrimethoxysilane, tridecafluoro-1,1,2,2-tetrahydrooctyltirmethoxysilane, p-tolyltrimethoxysilane, phenyltrimethoxysilane, phenylethyltrimethoxysilane, benzyltrimethoxysilane, diphenyldimethoxysilane, dimethyldimethoxysilane, diphenyldisilanol, cyclohexylmethyldimethoxysilane, vinyltrimethoxysilane, 3-glycidoxyproplytrimethoxy-silane, 3-(trimethoxysilyl)propylmethacrylate, hexamethylcyclotrisiloxane, 2,4,6-trimethyl-2,4,6-triphenylcyclotrisiloxane, 2,4,6,8-tetramethyl-2,4,6,8-tetraphenylcyclotetrasiloxane, hexaphenylcyclotrisiloxane, octamethylcyclotetrasiloxane, octaphenylcyclotetrasiloxane, and 2,4,6,8-tetramethyl-2,4,6,8-tetravinylcyclotetrasiloxane.

9. The composition in according to claim 6, wherein the composition includes from about 2% to about 80% by weight of the composition of the surface treated metal oxide nanoparticles.

10. A composition comprising a hydrophobic aromatic polymer binder having dispersed therein at least metal oxide nanoparticles that have surface attached thereto a surface treatment agent, wherein organic moieties of the surface treatment agent on the surface of the metal oxide nanoparticles have π—π interaction with aromatic components of the hydrophobic aromatic polymer.

11. The composition according to claim 10, wherein the surface treatment agent has a structure represented by formula (I)

R-Z(X)ₙY₃₋ₙ    (I)

wherein R and X each independently represents an alkyl group containing from about 1 carbon atom to about 30 carbon atoms, an aryl group containing from about 6 to about 60 carbon atoms, a substituted alkyl group containing from about 1 to about 30 carbon atoms or a substituted aryl group containing from about 6 to about 60 carbon atoms, an organic group containing of from about 1 to about 30 carbon atoms and a carbon—carbon double bond or a carbon—carbon triple bond, and epoxy-group, Z represents a silicon atom, titanium atom, aluminum atom or zirconium atom, and Y represents a hydrogen atom, a halogen atom, a hydroxyl group, an alkoxy group, or an allyl group, and n is an integer of from 0 to 3, or the surface treatment agent has a structure represented by formula (III)

wherein R¹ and R² each independently represents an alkyl group of from about 1 to about 30 carbon atoms, an aryl group of from about 6 to about 60 carbon atoms, and a substituted alkyl group or a substituted aryl group of from about 1 to about 30 carbon atoms, and z represents an integer of from about 3 to about 10.

12. The composition according to claim 10, wherein the metal oxide nanoparticles have an average size of from about 1 to about 250 nm.

13. The composition according to claim 10, wherein the surface treatment agent is selected from the group consisting of methyltrimethoxysilane, ethyltrimethoxysilane, methyltriethoxysilane, propyltrimethoxysilane, octyltrimethyoxysilane, trifluoropropyltrimethoxysilane, tridecafluoro-1,1,2,2-tetrahydrooctyltirmethoxysilane, p-tolyltrimethoxysilane, phenyltrimethoxysilane, phenylethyltrimethoxysilane, benzyltrimethoxysilane, diphenyldimethoxysilane, dimethyldimethoxysilane, diphenyldisilanol, cyclohexylmethyldimethoxysilane, vinyltrimethoxysilane, 3-glycidoxyproplytrimethoxy-silane, 3-(trimethoxysilyl)propylmethacrylate, hexamethylcyclotrisiloxane, 2,4,6-trimethyl-2,4,6-triphenylcyclotrisiloxane, 2,4,6,8-tetramethyl-2,4,6,8-tetraphenylcyclotetrasiloxane, hexaphenylcyclotrisiloxane, octamethylcyclotetrasiloxane, octaphenylcyclotetrasiloxane, and 2,4,6,8-tetramethyl-2,4,6,8-tetravinylcyclotetrasiloxane.

14. The composition according to claim 10, wherein the metal oxide nanoparticles are selected from the group consisting of silicon oxide, aluminum oxide, titanium oxide, cerium oxide, chromium oxide, zirconium oxide, zinc oxide, tin oxide, iron oxide, magnesium oxide, manganese oxide, nickel oxide, copper oxide, indium tin oxide, and mixtures thereof.

15. The composition according to claim 10, wherein the metal oxide nanoparticles are alumina nanoparticles.

16. The composition according to claim 10, wherein the hydrophobic aromatic polymer is selected from the group consisting of an aromatic polycarbonate, an aromatic polyester, an aromatic polyether, an aromatic polysulfone, an aromatic polyimide, and a vinyl polymer containing aromatic groups, wherein the metal oxide nanoparticles are selected from the group consisting of γ-alumina, δ-alumina, α-alumina and a mixture of γ-alumina with a different form of alumina, wherein the nanoparticles have an average size of from about 1 nm to about 200 μm, and wherein the organic moieties are selected from the group consisting of phenyl, totyl, naphthyl, benzyl, fluorophenyl, bromophenyl, chlorophenyl, phenylethyl and cyanophenyl.

17. The composition according to claim 10, wherein the composition includes from about 2% to about 80% by weight of the treated metal oxide nanoparticles.

18. A photoreceptor including a charge transport layer comprised of the composition of claim 10 and having charge transport molecules therein.

19. A xerographic device including the photoreceptor of claim 18.

* * * * *